United States Patent
Satish et al.

(10) Patent No.: US 8,352,409 B1
(45) Date of Patent: Jan. 8, 2013

(54) SYSTEMS AND METHODS FOR IMPROVING THE EFFECTIVENESS OF DECISION TREES

(75) Inventors: Sourabh Satish, Fremont, CA (US); Nicholas Graf, Culver City, CA (US); Lachlan Orr, Austin, TX (US); Shane Pereira, Newbury Park, CA (US); Scott Sullivan, Austin, TX (US)

(73) Assignee: Symantec Corporation, Mountain View, CA (US)

( * ) Notice: Subject to any disclaimer, the term of this patent is extended or adjusted under 35 U.S.C. 154(b) by 824 days.

(21) Appl. No.: 12/495,621

(22) Filed: Jun. 30, 2009

(51) Int. Cl.
*G06N 7/02* (2006.01)
*G06N 7/00* (2006.01)

(52) U.S. Cl. ........................................................ 706/52
(58) Field of Classification Search .................... 706/52; 704/9

See application file for complete search history.

(56) References Cited

U.S. PATENT DOCUMENTS

| | | | |
|---|---|---|---|
| 6,253,169 B1 * | 6/2001 | Apte et al. | 704/9 |
| 2004/0199484 A1 * | 10/2004 | Smith et al. | 706/52 |
| 2007/0136455 A1 | 6/2007 | Lee et al. | |

OTHER PUBLICATIONS

Pietersma, Diederik, et al.; "Induction and evaluation of decision trees for lactation curve analysis;" Dec. 17, 2002; McGill University; http://www.sciencedirect.com/science?_ob=ArticleURL&_udi=B6T5M-47G1SBG-3&_user=10&_rdoc=1 &fmt=&_orig=search&_sort=d&view=c&_acct=C00005 0221&_version=1&_urlVersion=0&_userid.

\* cited by examiner

*Primary Examiner* — Jeffrey A Gaffin
(74) *Attorney, Agent, or Firm* — Advantedge Law Group

(57) ABSTRACT

Systems and methods for improving the effectiveness of decision trees are disclosed. In one example, an exemplary method for performing such a task may include: 1) receiving, from at least one computing device, a) a sample, b) a classification assigned to the sample by a decision tree employed by the computing device, and c) identification information for a branch configuration that resulted in the classification, 2) determining that the decision tree incorrectly classified the sample, and then 3) excluding the offending branch configuration from future decision trees. An exemplary method for dynamically adjusting the confidence of decision-tree classifications based on community-supplied data, along with corresponding systems and computer-readable media, are also described.

18 Claims, 7 Drawing Sheets

SYSTEMS AND METHODS FOR IMPROVING THE EFFECTIVENESS OF DECISION TREES

BACKGROUND

Decision trees and other heuristics are commonly used as predictive models to map observations about an item with conclusions about the item's target value. For example, a security-software vendor may use decision trees as predictive models for identifying malware based on attributes, characteristics, and behaviors of files.

Decision trees may be trained and refined using a corpus of known samples. For example, a security-software vendor may train a decision tree used to identify malware by applying the decision tree to a corpus of samples containing known-malicious files and known-legitimate files.

Unfortunately, the accuracy of a decision tree is often limited by the size of the corpus of samples used to train the tree. As such, decision trees commonly generate false negatives and/or false positives upon being deployed and used in the real world. In order to improve the accuracy of a decision tree, decision-tree providers typically: 1) add the misclassified samples to the corpus of samples used to train the decision tree, 2) retrain the decision tree using the corpus of samples, and then 3) redeploy the retrained decision tree.

Unfortunately, the amount of time required to identify misclassified samples, incorporate these misclassified samples into the corpus of samples used to train a decision tree, and then retrain and redeploy a decision tree may introduce a significant delay, potentially leading to large numbers of misclassifications in the field. Moreover, even if a decision tree is retrained using a corpus of samples that includes misclassified samples gathered from the field, there is no guarantee that this retrained decision tree will exclude the precise combination of behaviors that resulted in the misclassifications that the decision-tree provider hoped to avoid by retraining the tree.

SUMMARY

As will be described in greater detail below, the instant disclosure generally relates to systems and methods for improving the effectiveness of decision trees. In one example, a backend device may perform such a task by receiving, from at least one computing device within a community of users: 1) a sample, 2) a classification assigned to the sample by a decision tree employed by the computing device, and 3) identification information (such as a unique identifier) for a branch configuration of the decision tree that resulted in the classification. The backend device may then determine that the decision tree incorrectly classified the sample in question and exclude the undesirable and uniquely identified branch configuration from future decision trees.

A branch configuration may refer to a single branch or a sequence of two or more branches within a decision tree. The systems and methods described herein may uniquely identify branch configurations in a variety of ways. For example, a branch configuration may be uniquely identified by name (e.g., by assigning a unique name to a branch configuration and/or each branch within a branch configuration), by number (e.g., by assigning a hexadecimal number to a branch configuration and/or each branch within a branch configuration), or the like. In some examples, the systems and methods described herein may also assign unique identifiers (such as names, numbers, hashes, or the like) to samples, decision trees used to classify such samples, and/or various nodes within such decision trees, each of which may also be used to uniquely identify branch configurations.

In one example, the backend device may add identification information (such as one or more unique identifiers, as detailed above) for the branch configuration that resulted in the incorrect classification to a branch-exclusion list. In this example, the branch-exclusion list may act as a blacklist that identifies undesirable (e.g., false-positive or false-negative prone) branches or branch configurations.

Upon training a new decision tree using a corpus of samples, a decision-tree provider may, prior to publishing or deploying the decision tree, query a database containing the community-based branch-exclusion list to determine whether the decision tree generates any of the branches or branch configurations contained on the branch-exclusion list. If so, then the decision-tree provider may remove these branches or branch configurations from the decision tree prior to publishing or deploying the same.

Systems and methods for dynamically adjusting the confidence of decision-tree classifications are also disclosed. In one example, a backend device may accomplish such a task by receiving, from at least one computing device within a community of users: 1) a sample, 2) a classification assigned to the sample by a decision tree, and 3) a unique identifier associated with a branch of the decision tree that resulted in the classification.

The backend device may then determine whether the decision tree correctly classified the sample and update a confidence score associated with the branch based on whether the decision tree correctly classified the sample. The backend device may then provide or publish the updated confidence score to at least one additional computing device within the community, which device may in turn use this information to update an instance of the decision tree employed by the device. Because the backend device may receive numerous classification results from a multitude of computing devices within a user community, in some examples the backend device may prioritize analyzing such classification results based on the prevalence of such classification results within the community.

By uniquely identifying and excluding undesirable (i.e., false-positive prone and/or false-negative prone) branch configurations from future decision trees, the systems and methods described herein may enable decision-tree providers to quickly and easily improve the accuracy and effectiveness of their decision trees. Moreover, by dynamically adjusting the confidence of decision-tree classifications in real-time based on community-supplied data, the systems and methods disclosed herein may enable providers of decision trees to quickly reduce the number of misclassifications that occur within a community without having to retrain, regenerate, and redeploy decision trees.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
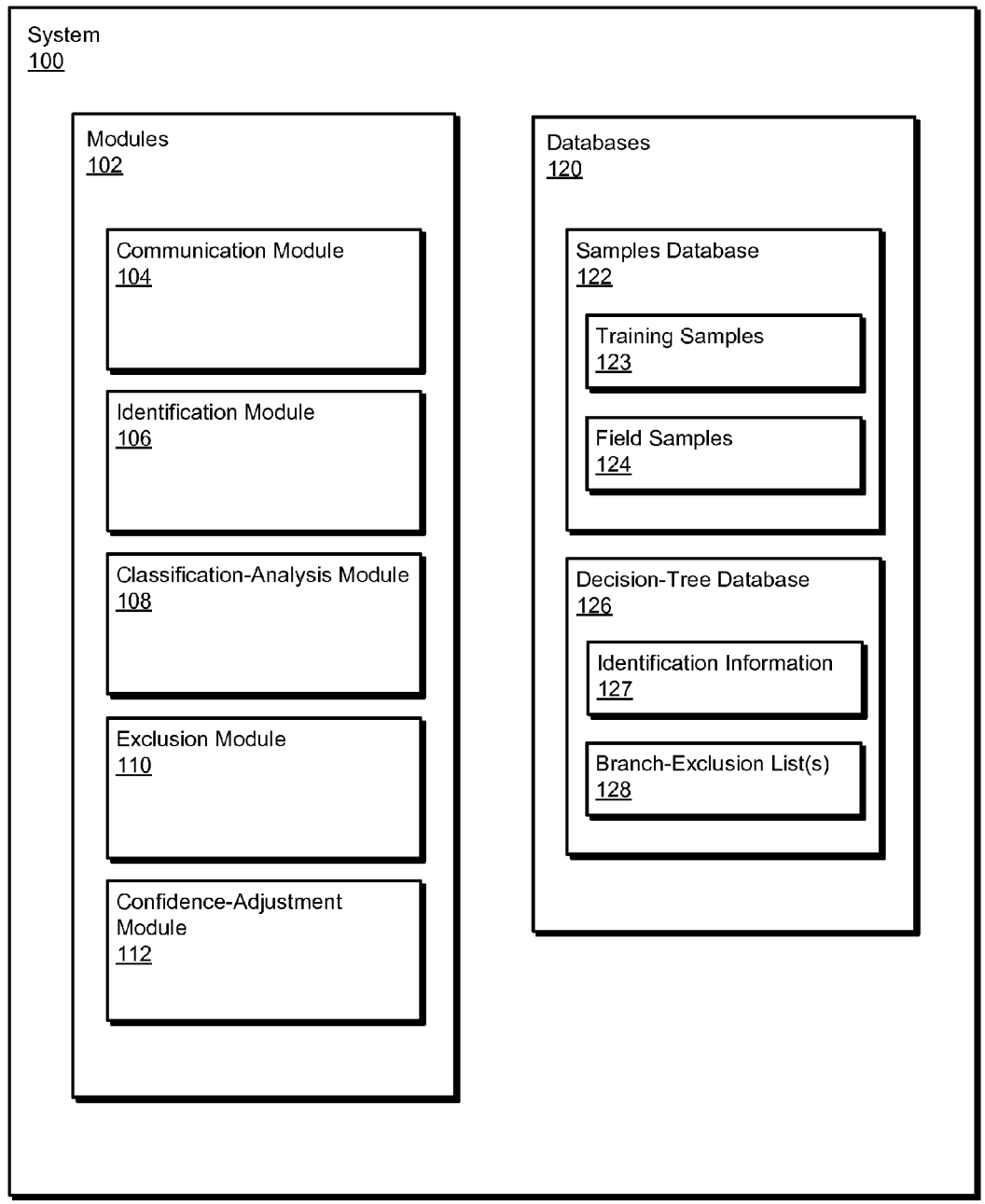
FIG. 1 is a block diagram of an exemplary system for improving the effectiveness of decision trees.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for improving the effectiveness of decision trees. The term "decision tree," as used herein, generally refers to any type or form of heuristic, tool, or model that may be used to classify, or make decisions with respect to, an object or data sample. In one example, and as will be described in greater detail below, a decision tree may be used as a heuristic to identify or detect malware.

Figure 2:
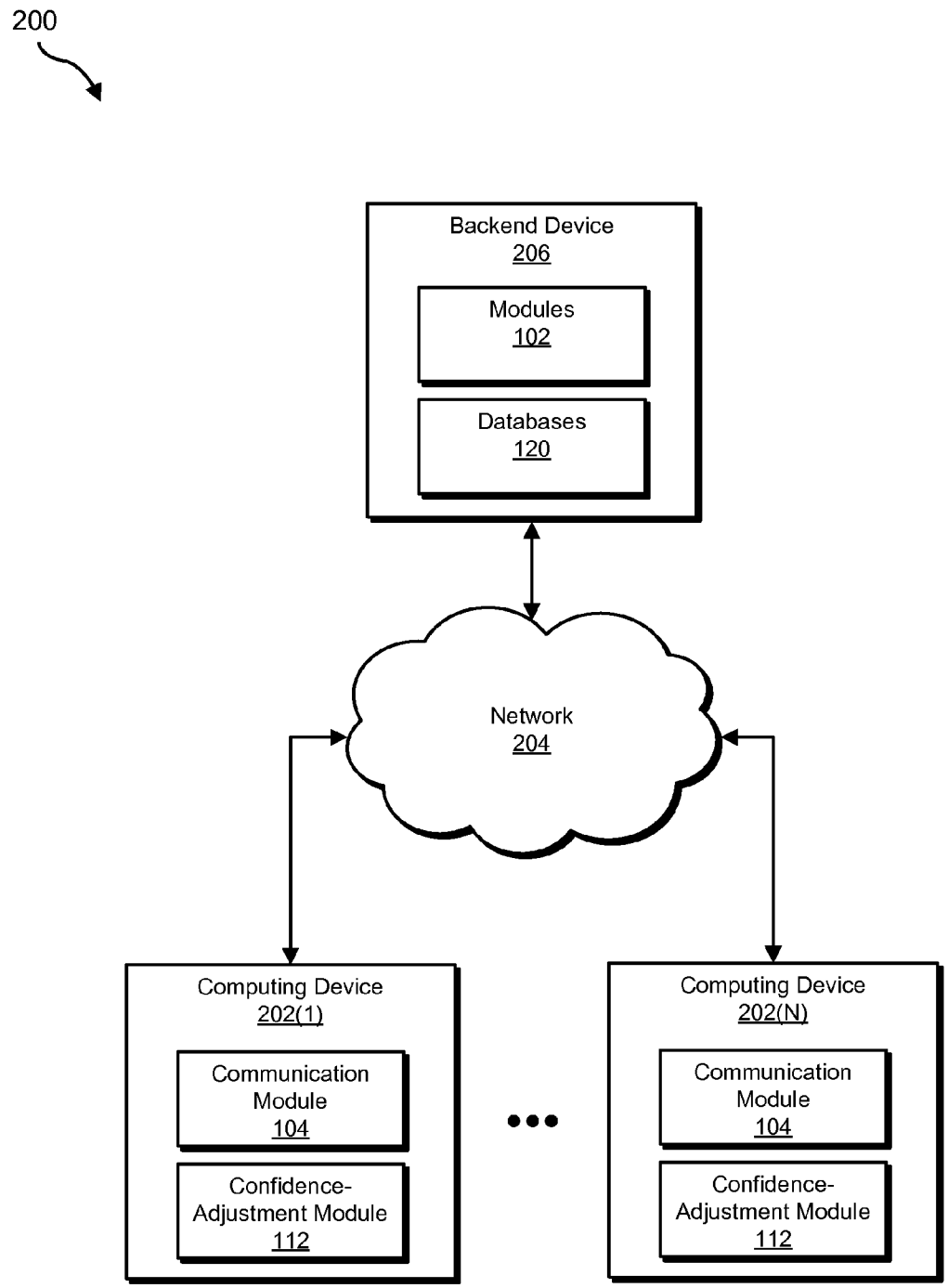
FIG. 2 is a block diagram of an exemplary system for improving the effectiveness of decision trees.

The following will provide, with reference to FIGS. 1-2, detailed descriptions of exemplary systems for improving the effectiveness of decision trees. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for improving the effectiveness of decision trees. As illustrated in this figure, exemplary system 100 may include one or more modules 102 for performing one or more tasks. For example, and as will be explained in greater detail below, exemplary system 100 may include a communication module 104 programmed to facilitate communication between a backend (such as backend device 206 in FIG. 2) and a plurality of client-side computing devices (such as computing devices 202(1)-202(N) in FIG. 2). Exemplary system 100 may also include an identification module 106 programmed to assign unique identifiers to both decision trees and various nodes and branches within such decision trees.

In addition, and as will be described in greater detail below, exemplary system 100 may include a classification-analysis module 108 programmed to determine whether classifications made by decision trees are correct. Exemplary system 100 may also include an exclusion module 110 programmed to exclude decision-tree branches that result in incorrect classifications from future decision trees. In addition, exemplary system 100 may include a confidence-adjustment module 112 programmed to dynamically update confidence scores associated with various branches in a decision tree based on community-supplied feedback. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing devices 202(1)-202(N) and/or backend device 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a samples database 122 for storing training samples 123 used to train decision trees and field samples 124 received from computing devices within a community of users. Exemplary system 100 may also include a decision-tree database 126 for storing: 1) unique identifiers for decision trees, decision-tree nodes, and decision-tree branches (stored, for example, as identification information 127) and 2) lists that identify one or more decision-tree branches that should be excluded from future decision trees (stored, for example, as branch-exclusion lists 128).

Databases 120 in FIG. 1 may represent a portion of one or more computing devices. For example, databases 120 may represent a portion of backend device 206 in FIG. 2, computing system 610 in FIG. 6, and/or portions of exemplary network architecture 700 in FIG. 7. Alternatively, databases 120 in FIG. 1 may represent one or more physically separate devices capable of being accessed by a computing device, such as backend device 206 in FIG. 2, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a plurality of computing devices 202(1)-202(N) in communication with a backend device 206 via a network 204. In one embodiment, and as will be described in greater detail below, backend device 206 may be programmed to: 1) receive, from a plurality of computing devices within a user community (such as computing devices 202(1)-(N) in FIG. 2), a) a sample (such as a file), b) a classification assigned to the sample by a decision tree (such as decision tree 400 in FIG. 4) employed by the computing devices, and c) identification information for a branch configuration that resulted in the classification, 2) determine that the decision tree incorrectly classified the sample, and then 3) exclude the offending branch configuration from future decision trees (including future iterations of this particular decision tree).

In another embodiment, and as will be described in greater detail below, backend device 206 may be programmed to: 1) receive, from a plurality of computing devices within a user community (such as computing devices 202(1)-(N) in FIG. 2), a) a sample, b) a classification assigned to the sample by a decision tree (such as decision tree 400 in FIG. 4), and c) a unique identifier associated with a branch configuration in the decision tree that resulted in the classification, 2) determine whether the decision tree correctly classified the sample, 3) update, based on whether the decision tree correctly classified the sample, a confidence score associated with the branch, and then 4) provide or publish the updated confidence score to at least one additional computing device within the community (such as computing devices 202(1)-(N) in FIG. 2) to enable the additional computing device to update an instance of the decision tree employed by the additional computing device.

Computing devices 202(1)-(N) generally represent any type or form of computing device capable of reading computer-executable instructions. Examples of computing devices 202(1)-(N) include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Backend device 206 generally represents any type or form of computing device that is capable of using community data to improve the effectiveness of decision trees. Examples of backend device 206 include, without limitation, application servers and database servers configured to provide various database services and/or run certain software applications. In one example, backend device 206 may be configured to improve the effectiveness of decision trees based on data received from a plurality of client-side computing subsystems within a community, such as computing devices 202(1)-(N). In this example, computing devices 202(1)-(N) may represent all or a portion of a single community or a plurality of communities. For example, computing devices 202(1)-(N) may represent computing systems within a single or a plurality of user bases, a single or a plurality of enterprises, or portions or combinations of one or more of the same.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing devices 202(1)-(N) and backend device 206.

Figure 3:
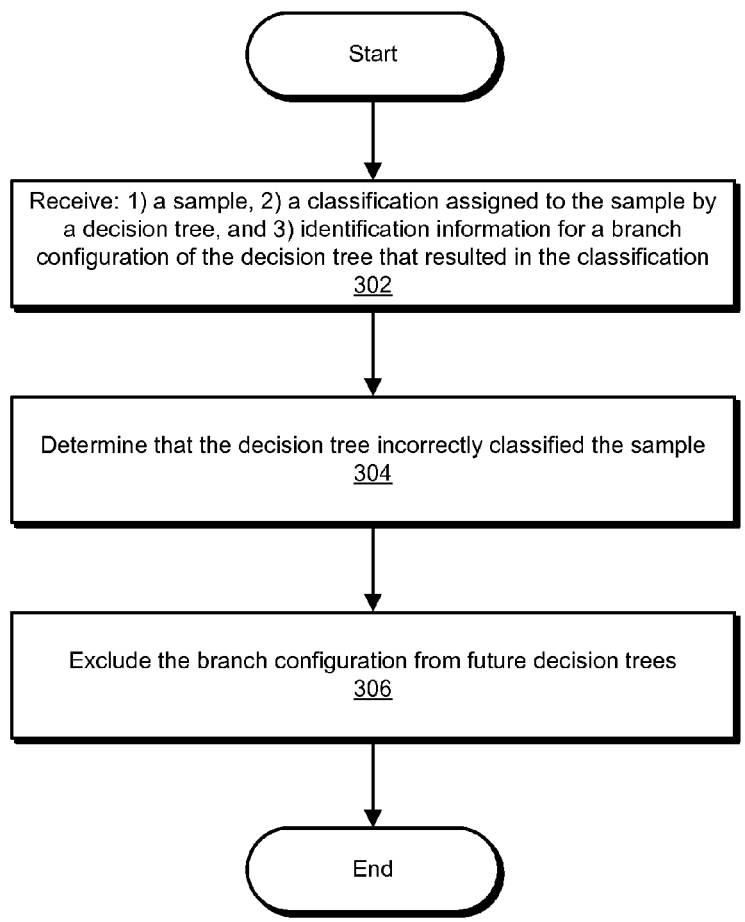
FIG. 3 is a flow diagram of an exemplary method for improving the effectiveness of decision trees.

FIG. 3 is a flow diagram of an exemplary computer-implemented method 300 for improving the effectiveness of decision trees. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in this figure, at step 302 the system may receive, from at least one computing device: 1) a sample, 2) a classification assigned to the sample by a decision tree, and 3) identification information for a branch configuration that resulted in the classification. For example, backend device 206 in FIG. 2 (which may, as detailed above, include communication module 104 from FIG. 1) may receive from one or more of computing devices 202(1)-(N) (which may, as detailed above, represent a plurality of computing devices within a user community): 1) a file, 2) a classification (e.g., "malicious") assigned to the file by a decision tree employed by computing devices 202(1)-(N), and 3) a unique identifier or other information that may be used to identify a branch configuration of the decision tree that resulted in the classification.

The term "sample," as used herein, may refer to any item or object that may be analyzed or classified by a decision tree. Examples of samples include, without limitation, files (such as executables, DLLs, or the like), electronic communications (such as e-mails and instant messages), devices (such as computing devices and networks), or any other item or object that may be subject to classification or analysis.

In addition, the term "classification," as used herein, generally refers to decisions made with respect to a sample based on the sample's characteristics, attributes, properties, behaviors, or the like. Examples of such classifications include, without limitation, classifying an executable file as malware, classifying an e-mail as spam, classifying a computing device or network-access point as compromised or untrustworthy, or the like.

Figure 4:
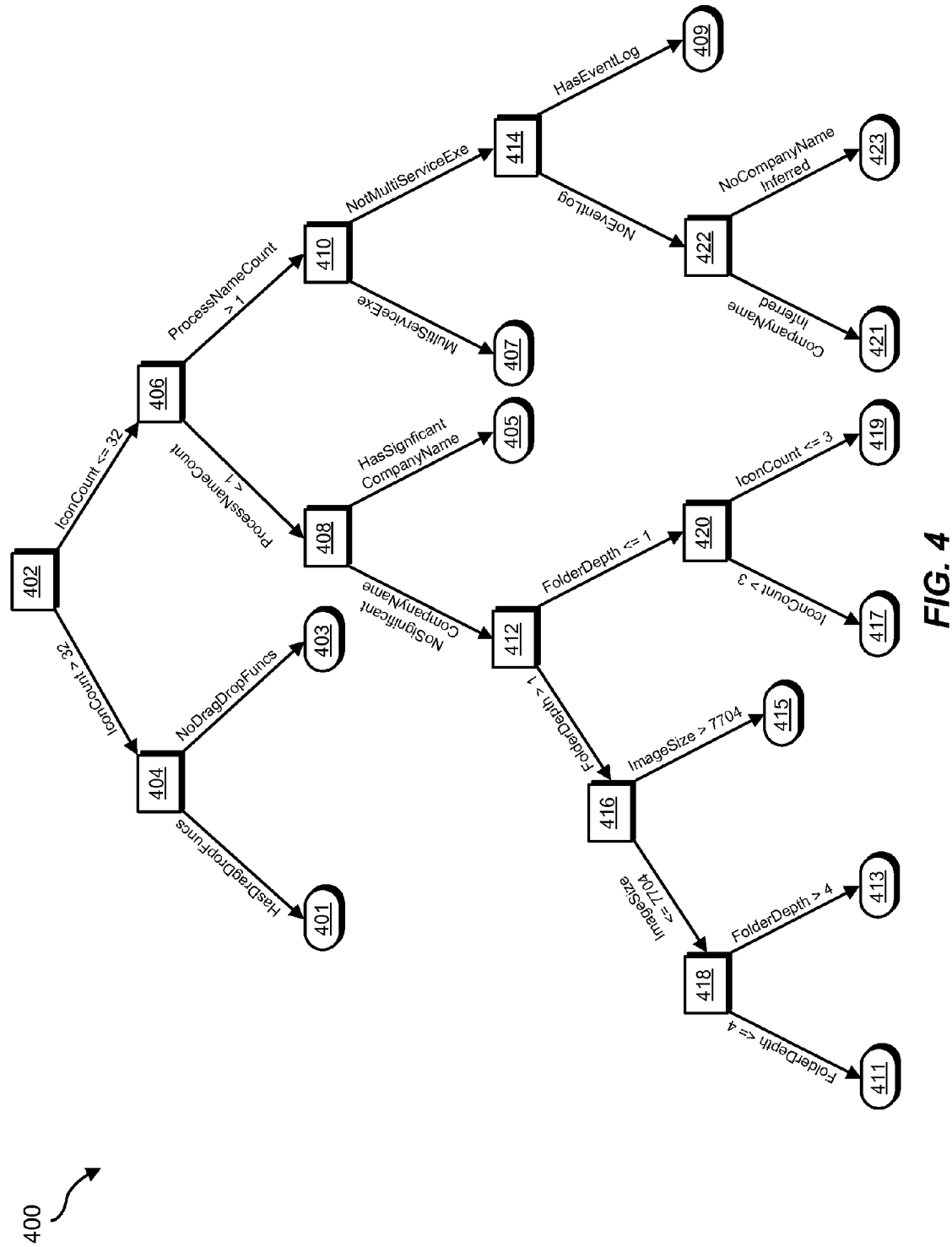
FIG. 4 is a block diagram of an exemplary decision tree.

For example, computing device 202(1) in FIG. 2 may use a decision tree, such as exemplary decision tree 400 in FIG. 4, to determine whether a file is malicious. In this example, computing device 202(1) may, at decision node 402 in FIG. 4, determine whether the file generates more than 32 icons. If so, control may proceed along the branch "IconCount>32" to decision node 402, where computing device 202(1) may determine whether the file exhibits or enable drag/drop functionality. If the file does not exhibit or enable drag/drop functionality, control may proceed along the branch "NoDrag-DropFuncs" to classification result 403. In this example, classification result 403 may indicate, with a moderately high degree of confidence (e.g., 79 on a scale of 1-100), that the file in question is suspicious.

Upon classifying the file, computing device 202(1) may provide to backend device 206: 1) a copy of the file, 2) the classification assigned to the file (in this case, classification result 403, which indicates that the file is suspicious), and 3) a unique identifier associated with the branch configuration that resulted in this classification.

The term "branch configuration," as used herein, may refer to a single branch or a sequence of two or more branches within a decision tree. For example, the single branch "Has-DragDropFuncs" in exemplary decision tree 400 in FIG. 4 may represent a branch configuration resulting in classification result 401. Similarly, the sequence of branches "IconCount<= =32," "ProcessNameCount<1," and "HasSignificantCompanyName" may represent a branch configuration resulting in classification result 405. Branch configurations may be order-dependent or order-independent.

The systems and methods described herein may uniquely identify branch configurations in a variety of ways. For example, these systems and methods may identify a branch configuration by name (e.g., by assigning a unique name to a branch configuration and/or each branch within a branch configuration), by number (e.g., by assigning a hexadecimal number to a branch configuration and/or each branch within a branch configuration), or the like. In some examples, these systems and methods may also assign unique identifiers (such as names, numbers, hashes, or the like) to samples, decision trees used to classify such samples, and/or various nodes within such decision trees, each of which may also be used to uniquely identify the branch in question.

As such, backend device 206 in FIG. 2 may identify branch configurations in a variety of ways, including, for example, based on: 1) a unique identifier assigned to a branch configuration, 2) a unique identifier assigned to a sample classified by the branch configuration, 3) a unique identifier assigned to a decision tree that contains the branch configuration, and/or 4) a unique identifier assigned to various nodes (such as a classification result) within the decision tree.

In some examples, backend device 206 in FIG. 2 may store the sample received in step 302 in samples database 122 in FIG. 1. Similarly, backend device 206 may store the branch-configuration identification information received in step 302 in decision-tree database 126 in FIG. 1.

Returning to FIG. 3, at step 304 the system may determine that the decision tree identified in step 302 incorrectly classified the sample in question. For example, backend device 206 in FIG. 2 (which may, as detailed above, include classification-analysis module 108 from FIG. 1) may determine that the uniquely identified decision tree employed by computing device 202(1) incorrectly classified the sample received in step 302.

Backend device 206 may determine whether a decision tree incorrectly classified a sample in a variety of ways. In one example, backend device 206 may automatically analyze the sample in question using any number of signature-based and/or heuristic-based models or methods. For example, in the context of an antivirus system, backend device 206 may determine: 1) that the sample received in step 302 represents a malicious file and 2) that the decision tree employed by computing device 202(1) incorrectly classified the sample as a non-malicious file (i.e., the classification represents a false negative). Similarly, backend device 206 may determine: 1) that the sample received in step 302 represents a non-malicious file and 2) that the decision tree employed by computing device 202(1) incorrectly classified the sample in question as a malicious file (i.e., the classification represents a false positive).

In other embodiments, backend device 206 may: 1) present the sample, along with the classification of the same received in step 302, to an administrator of backend device 206 and then 2) prompt the administrator to indicate whether the sample was correctly classified.

Returning to FIG. 3, at step 306 the system may exclude the branch configuration that resulted in the incorrect classification from future decision trees. For example, backend device 206 in FIG. 2 (which may, as detailed above, include exclusion module 110 from FIG. 1) may exclude the branch configuration that resulted in the incorrect classification of the sample received in step 302 from future decision trees. Upon completion of step 306 in FIG. 3, exemplary method 300 may terminate.

Backend device 206 may perform step 306 in a variety of ways. In one example, backend device 206 may add identification information (such as one or more unique identifiers, as detailed above) for the branch configuration that resulted in the incorrect classification to a branch-exclusion list, such as branch-exclusion list 128 in decision-tree database 126 in FIG. 1. In this example, branch-exclusion list 128 may act as a blacklist that identifies undesirable (e.g., false-positive or false-negative prone) branches or branch configurations.

Upon training a new decision tree using a corpus of samples, a decision-tree provider may, prior to publishing or deploying the decision tree, query decision-tree database 126 to determine whether the decision tree contains or generates any of the branches or branch configurations contained on branch-exclusion list 128. If so, then the decision-tree provider may remove these branches or branch configurations from the decision tree prior to publishing or deploying the same.

By uniquely identifying undesirable (i.e., false-positive prone or false-negative prone) branch configurations in decision trees, the systems and methods described herein may enable decision-tree providers to exclude such undesirable branch configurations from future decision trees. As such, these systems and methods may enable decision-tree providers to quickly and easily improve the accuracy and effectiveness of their decision trees.

Figure 5:
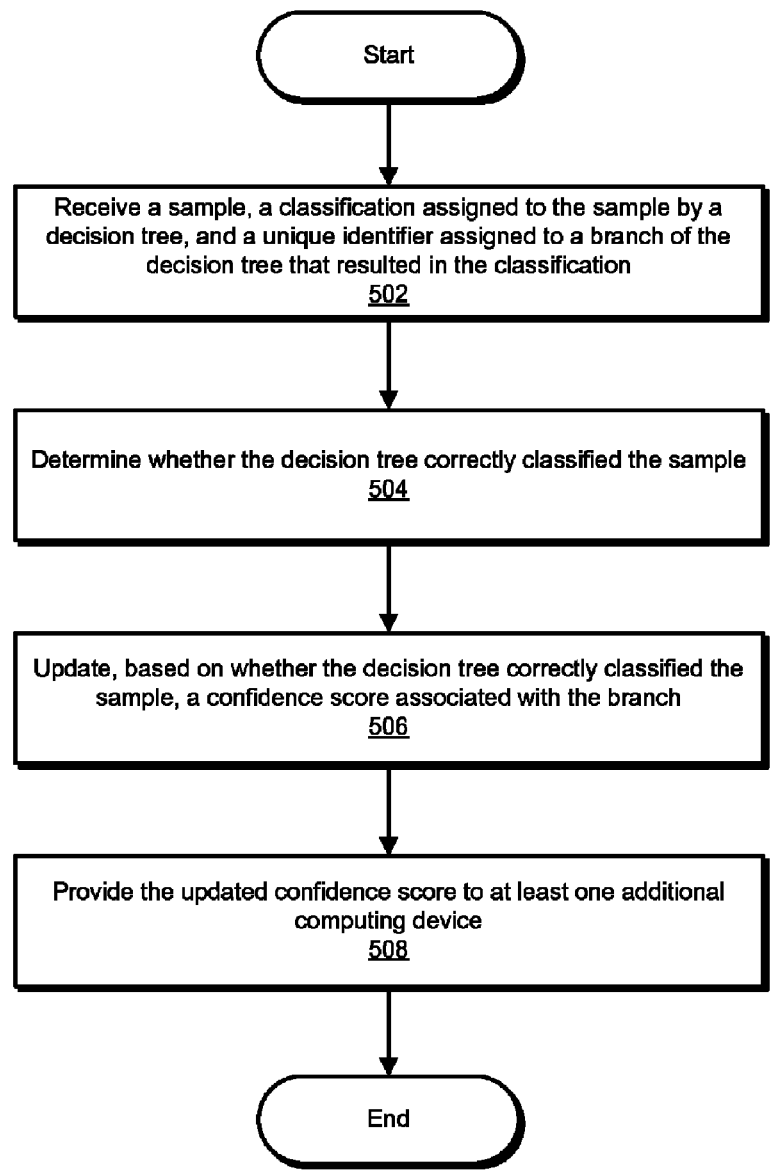
FIG. 5 is a flow diagram of an exemplary method for dynamically adjusting the confidence of decision-tree classifications based on community-supplied data.

As detailed above, embodiments of the instant disclosure may also be used to dynamically adjust the confidence of decision-tree classifications in real time. FIG. 5 is a flow diagram of an exemplary computer-implemented method 500 for performing such a task. The steps shown in FIG. 5 may be performed by any suitable computer-executable code and/or computing system. In some embodiments, the steps shown in FIG. 5 may be performed by one or more of the components of system 100 in FIG. 1 and/or system 200 in FIG. 2.

As illustrated in FIG. 5, at step 502 the system may receive, from at least one computing device: 1) a sample, 2) a classification assigned to the sample by a decision tree employed by the computing device, and 3) a unique identifier assigned to a branch of the decision tree that resulted in the classification. For example, backend device 206 in FIG. 2 (which may, as detailed above, include communication module 104 from FIG. 1) may receive, from computing device 202(1): 1) a sample (such as a file), 2) a classification (e.g., "malicious") assigned to the sample by a decision tree employed by computing device 202(1), and 3) a unique identifier assigned to a branch of the decision tree that resulted in this classification.

Decision-tree branches may be uniquely identified in a variety of ways. As detailed above, decision-tree branches may be identified by name (e.g., "IconCount>32"), by number (using, for example, a hexadecimal numbering format), or the like. In some examples, decision-tree branches may also be identified by a unique identifier associated with a decision tree that contains the branch, a unique identifier associated with a sample classified by the decision tree, and/or a unique identifier associated with the classification that results from the branch.

Upon receiving the sample, the classification, and the decision-tree branch unique identifier in step 502, at step 504 the system may determine whether the decision tree correctly classified the sample. For example, backend device 206 in FIG. 2 (which may, as detailed above, include classification-analysis module 108 from FIG. 1) may determine whether a decision tree employed by computing device 202(1) correctly classified the sample in question.

For example, computing device 202(1) may attempt to determine whether a file represents malware by applying exemplary decision tree 400 in FIG. 4 to the file. In this example, decision tree 400 may determine, at node 402, that the icon count of the file in question is greater than 32. The control flow of decision tree 400 may then proceed to node 404 (along branch "IconCount>32") where decision tree 400 may determine that the file in question does not enable or possess drag/drop functionality. As such, control flow may proceed to node 403 (along branch "NoDragDropFuncs"), where decision tree 400 may classify the file (at classification node 403) as a suspicious file with a moderately high degree of confidence (e.g., 79 on a scale of 1-100).

Upon classifying the file, computing system 202(1) may send to backend device 206 in FIG. 2: 1) a copy of the file in question, 2) a classification assigned to the file (in this example, the classification assigned at classification node 403, "suspicious"), and 3) a unique identifier for the branch "NoDragDropFuncs" and/or the branch "IconCount>32." In some examples, computing device 202 (1) may also send a unique identifier for decision tree 400, the file in question, and/or classification node 403 to backend device 206.

Returning to FIG. 5, at step 504 the system may determine whether the decision tree employed by the computing device correctly classified the sample received in step 502. For example, backend device 206 in FIG. 2 (which may, as detailed above, include classification-analysis module 108 from FIG. 1) may determine whether the exemplary decision tree 400 employed by computing device 202(1) correctly classified the sample received in step 502.

As detailed above, backend device 206 may determine whether decision trees have correctly classified samples in a variety of ways. For example, in the context of an antivirus solution, backend device 206 may: 1) determine whether the sample in question represents a malicious or non-malicious file and then 2) determine whether the decision tree correctly classified the sample as malicious or non-malicious.

Because backend device 206 may receive numerous classification results from a multitude of computing devices within a user community, in some examples backend device 206 may prioritize analyzing such classification results based on the prevalence of such classification results within the community. For example, in some embodiments backend device 206 may: 1) quantify the number of instances of a unique branch within a user community and then 2) prioritize analysis of classifications that result from this unique branch based on the number of instances of the branch within the community. For example, if a specific branch (e.g., "NoDragDropFuncs") appears in 95% of the decision trees generated within a user community, then backend device 206 may prioritize the analysis of classification results received from this branch over less-prevalent branches within the community.

Returning to FIG. 5, the system may update a confidence score associated with the branch identified in step 502 based on whether the decision tree correctly classified the sample in question. For example, backend device 206 in FIG. 2 (which may, as detailed above, include confidence-adjustment module 112 from FIG. 1) may update a confidence score associated with the branch identified in step 502 based on whether this branch resulted in the correct classification of the sample in question.

For example, if backend device 206 determines, by analyzing classification results from a multitude of computing devices within a user community, that the branch "NoDragDropFuncs" in decision tree 400 in FIG. 4 results in misclassification of real-world samples nearly 50% of the time, then backend device 206 may lower a confidence score associated with this branch.

Confidence scores generally represent the error-rate potential for a specific branch. Confidence scores may be calculated and quantified in a variety of ways. For example, confidence scores may be calculated using normal approximation intervals, Wilson score intervals, Clopper-Pearson intervals, or any other suitable method or algorithm.

Returning to FIG. 5, at step 508 the system may provide the updated confidence score to at least one additional computing device. For example, backend device 206 in FIG. 2 (which may, as detailed above, include communication module 104 from FIG. 1) may provide or publish the updated confidence score to one or more of computing devices 202(1)-(N). Upon completion of step 508 in FIG. 5, exemplary method 500 may terminate.

Upon receiving the updated confidence score from backend device 206, computing devices 202(1)-(N) may dynamically update an instance of the decision tree in question. For example, if computing device 202(N) receives an updated and lowered confidence score for the branch "NoDragDropFuncs" for decision tree 400 in FIG. 4 from backend device 206, then computing device 202(N) may dynamically update decision tree 400 to include the lowered confidence score for this particular branch.

In some examples, backend device 206 may provide updated confidence scores to additional computing devices upon receiving queries for the same from the additional computing devices. For example, computing device 202(N) in FIG. 2 may, prior to running decision tree 400 in FIG. 4, query backend device 206 for updates to decision tree 400. In response, backend device 206 may provide updated confidence scores for decision tree 400 to computing device 202(N). Computing device 202(N) may then update decision tree 400 to include these updated confidence scores prior to running decision tree 400 on a sample.

By dynamically adjusting the confidence of decision-tree classifications in real-time based on community-supplied data, the systems and methods disclosed herein may enable providers of decision trees to quickly reduce the number of misclassifications that occur within a user community. Moreover, these systems and methods may enable decision-tree providers to accomplish this task without having to retrain, regenerate, and redeploy decision trees.

Figure 6:
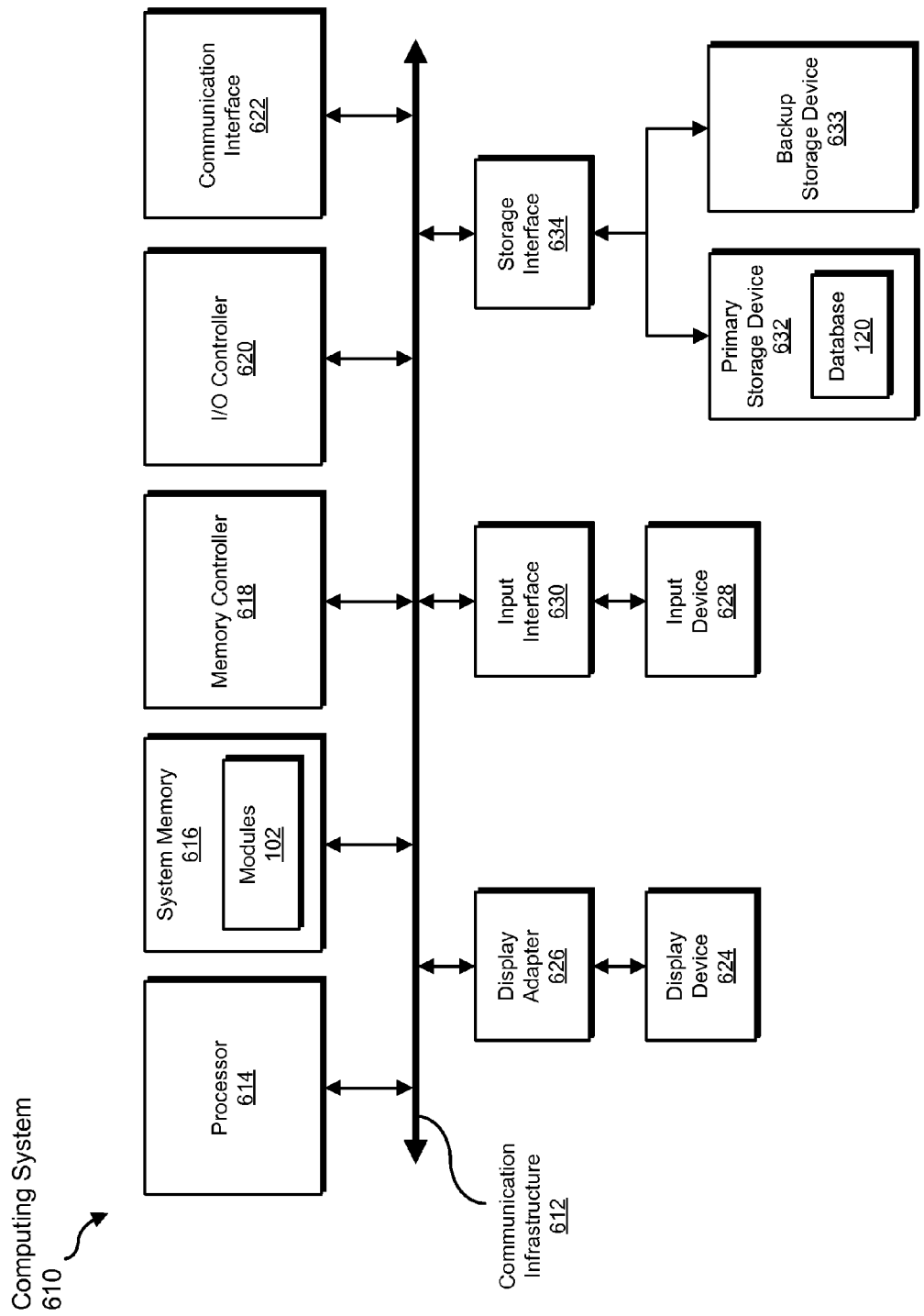
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the receiving, determining, excluding, adding, updating, providing, quantifying, and prioritizing steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as receiving, determining, excluding, adding, updating, providing, quantifying, and prioritizing.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the receiving, determining, excluding, adding, updating, providing, quantifying, and prioritizing steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the receiving, determining, excluding, adding, updating, providing, quantifying, and prioritizing steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the receiving, determining, excluding, adding, updating, providing, quantifying, and prioritizing steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the receiving, determining, excluding, adding, updating, providing, quantifying, and prioritizing steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
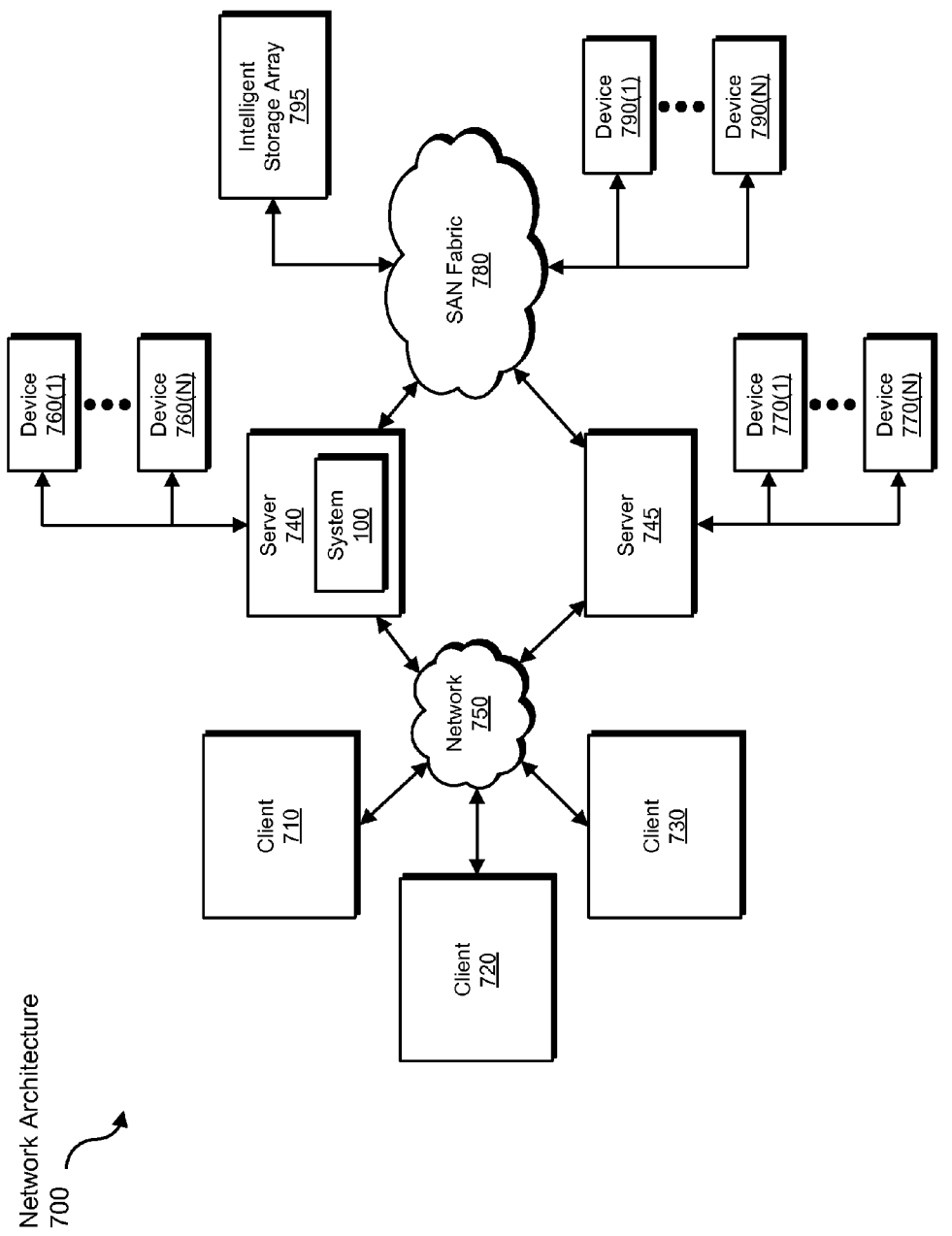
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6.

Similarly, servers 740 and 745 generally represent computing devices or systems, such as application servers or database servers, configured to provide various database services and/or run certain software applications. In one example, server 740 may include system 100 from FIG. 1. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the receiving, determining, excluding, adding, updating, providing, quantifying, and prioritizing steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for improving the effectiveness of decision trees. In one example, such a method may include: 1) receiving, from at least one computing device, a) a sample, b) a classification assigned to the sample by a decision tree, and c) identification information for a branch configuration of the decision tree that resulted in the classification, 2) determining that the decision tree incorrectly classified the sample, and then 3) excluding the branch configuration from future decision trees.

In some examples, the branch configuration may represent a single branch. In this example, excluding the branch configuration from future decision trees may include excluding this single branch from future decision trees. In other embodiments, the branch configuration may include a sequence of at least two branches. In this example, excluding the branch configuration from future decision trees may include excluding the sequence of the at least two branches from future decision trees.

In some examples, excluding the branch configuration from future decision trees may include adding the identification information for the branch configuration to a branch-exclusion list. This identification information may include, for example, a unique identifier associated with the decision tree, a unique identifier associated with at least one branch of the decision tree, a unique identifier associated with the sample, and/or a unique identifier associated with the classification.

In one example, determining that the decision tree incorrectly classified the sample may include: 1) determining that the sample represents a malicious file and that the decision tree incorrectly classified the sample as a non-malicious file and/or 2) determining that the sample represents a non-malicious file and that the decision tree incorrectly classified the sample as a malicious file.

In another embodiment, a computer-implemented method for dynamically adjusting the confidence of decision-tree classifications may include: 1) receiving, from at least one computing device, a) a sample, b) a classification assigned to the sample by a decision tree, and c) a unique identifier associated with a branch of the decision tree that resulted in the classification, 2) determining whether the decision tree correctly classified the sample, 3) updating, based on whether the decision tree correctly classified the sample, a confidence score associated with the branch, and then 4) providing the updated confidence score to at least one additional computing device to enable the additional computing device to update an instance of the decision tree employed by the additional computing device.

The confidence score may represent an error-rate potential for the branch. In some examples, the method may include, prior to determining whether the decision tree correctly classified the sample: 1) quantifying the number of instances of the branch within a user community and then 2) prioritizing when to analyze the classification of the decision tree based on the number of instances of the branch within the community.

In one example, determining whether the decision tree correctly classified the sample may include: 1) determining whether the sample represents a malicious file or a non-malicious file and 2) determining whether the decision tree correctly classified the sample as a malicious file or a non-malicious file.

In addition, providing the updated confidence score to at least one additional computing device may include: 1) receiving, from the additional computing device, a query for updated confidence information for the instance of the decision tree and then 2) providing, in response to the query, the updated confidence score. The method may also include receiving, from the computing device, a unique identifier associated with the decision tree, a unique identifier associated with the classification, and/or a unique identifier associated with the sample.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, modules 102 from FIG. 1 may transform characteristics of, and/or data stored in, databases 120 in FIG. 1 (which may, as detailed above, represent a portion of backend device 206 in FIG. 2).

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:
1. A computer-implemented method for improving the effectiveness of decision trees, at least a portion of the method being performed by a computing device comprising at least one processor, the method comprising:
receiving, from at least one computing device:
a sample;
a classification assigned to the sample by a decision tree;

identification information for a branch configuration of the decision tree that resulted in the classification;
determining that the decision tree incorrectly classified the sample by at least one of:
determining that the sample represents a malicious file and that the decision tree incorrectly classified the sample as a non-malicious file;
determining that the sample represents a non-malicious file and that the decision tree incorrectly classified the sample as a malicious file;
excluding the branch configuration from future decision trees.

2. The method of claim 1, wherein the branch configuration comprises a single branch.

3. The method of claim 2, wherein excluding the branch configuration from future decision trees comprises excluding the single branch from future decision trees.

4. The method of claim 1, wherein the branch configuration comprises a sequence of at least two branches.

5. The method of claim 4, wherein excluding the branch configuration from future decision trees comprises excluding the sequence of the at least two branches from future decision trees.

6. The method of claim 1, wherein excluding the branch configuration from future decision trees comprises adding the identification information for the branch configuration to a branch-exclusion list.

7. The method of claim 1, wherein the identification information for the branch configuration comprises at least one of:
a unique identifier associated with the decision tree;
a unique identifier associated with at least one branch of the decision tree;
a unique identifier associated with the classification;
a unique identifier associated with the sample.

8. The method of claim 1, embodied on a computer-readable-storage medium comprising computer-readable instructions.

9. A computer-implemented method for dynamically adjusting the confidence of decision-tree classifications, at least a portion of the method being performed by a computing device comprising at least one processor, the method comprising:
receiving, from at least one computing device:
a sample;
a classification assigned to the sample by a decision tree;
a unique identifier associated with a branch of the decision tree that resulted in the classification;
determining whether the decision tree correctly classified the sample by:
determining whether the sample represents a malicious file or a non-malicious file;
determining whether the decision tree correctly classified the sample as a malicious file or a non-malicious file;
updating, based on whether the decision tree correctly classified the sample, a confidence score associated with the branch;
providing the updated confidence score to at least one additional computing device to enable the additional computing device to update an instance of the decision tree employed by the additional computing device.

10. The method of claim 9, wherein the confidence score represents an error-rate potential for the branch.

11. The method of claim 9, further comprising, prior to determining whether the decision tree correctly classified the sample:
quantifying the number of instances of the branch within a user community;
prioritizing when to analyze the classification of the decision tree based on the number of instances of the branch within the community.

12. The method of claim 9, wherein providing the updated confidence score to at least one additional computing device comprises:
receiving, from the additional computing device, a query for updated confidence information for the instance of the decision tree;
providing, in response to the query, the updated confidence score.

13. The method of claim 9, further comprising receiving, from the computing device, at least one of:
a unique identifier associated with the decision tree;
a unique identifier associated with the classification;
a unique identifier associated with the sample.

14. The method of claim 9, embodied on a computer-readable-storage medium comprising computer-readable instructions.

15. A system for dynamically adjusting the confidence of decision-tree classifications, the system comprising:
a backend device comprising at least one processor programmed to:
receive, from at least one computing device:
a sample;
a classification assigned to the sample by a decision tree;
a unique identifier associated with a branch of the decision tree that resulted in the classification;
determine whether the decision tree correctly classified the sample by:
determining whether the sample represents a malicious file or a non-malicious file;
determining whether the decision tree correctly classified the sample as a malicious file or a non-malicious file;
update, based on whether the decision tree correctly classified the sample, a confidence score associated with the branch;
provide the updated confidence score to at least one additional computing device comprising at least one processor to enable the additional computing device to update an instance of the decision tree employed by the additional computing device.

16. The system of claim 15, wherein the backend device provides the updated confidence score to the additional computing device in response to a query submitted by the additional computing device.

17. The system of claim 15, wherein the backend device is further programmed to receive from the computing device at least one of:
a unique identifier associated with the decision tree;
a unique identifier associated with the classification.

18. The system of claim 15, wherein the backend device is further programmed to:
quantify the number of instances of the branch within a user community;
prioritize when to analyze the classification of the decision tree based on the number of instances of the branch within the community.

* * * * *